(12) United States Patent
Chang et al.

(10) Patent No.: US 9,544,076 B2
(45) Date of Patent: Jan. 10, 2017

(54) METHOD AND SYSTEM FOR TUNABLE UPSTREAM BANDWIDTH UTILIZING AN INTEGRATED MULTIPLEXING DEVICE

(71) Applicant: MaxLinear, Inc., Carlsbad, CA (US)

(72) Inventors: Glenn Chang, Carlsbad, CA (US); Sridhar Ramesh, Carlsbad, CA (US); Timothy Gallagher, Encinitas, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 460 days.

(21) Appl. No.: 13/887,314

(22) Filed: May 4, 2013

(65) Prior Publication Data
US 2013/0294462 A1    Nov. 7, 2013

Related U.S. Application Data

(60) Provisional application No. 61/642,514, filed on May 4, 2012.

(51) Int. Cl.
| | |
|---|---|
| H04J 1/02 | (2006.01) |
| H04B 3/20 | (2006.01) |
| H04J 1/04 | (2006.01) |
| H04B 1/525 | (2015.01) |
| H04W 16/14 | (2009.01) |

(52) U.S. Cl.
CPC ............ *H04J 1/045* (2013.01); *H04B 1/525* (2013.01); *H04W 16/14* (2013.01)

(58) Field of Classification Search
CPC ............ H04L 12/2801; H04N 21/4385; H04N 21/6118; H04N 21/6168
USPC .................. 370/290–291, 480, 488, 497
See application file for complete search history.

(56) References Cited

U.S. PATENT DOCUMENTS

| | | | | |
|---|---|---|---|---|
| 5,528,694 | A * | 6/1996 | Van De Kerkhof | H04S 5/00 381/22 |
| 7,436,910 | B2 * | 10/2008 | Fudge | H04B 1/0003 375/340 |
| 8,085,802 | B1 * | 12/2011 | Monk | H04L 5/0046 370/419 |
| 8,498,294 | B1 * | 7/2013 | Monk | H04L 12/2801 370/392 |
| 8,631,450 | B1 * | 1/2014 | Bernath et al. | 725/78 |
| 8,634,296 | B2 * | 1/2014 | Agarwal | H04B 7/18515 370/230 |

(Continued)

*Primary Examiner* — Khaled Kassim
*Assistant Examiner* — Berhanu Belete
(74) *Attorney, Agent, or Firm* — McAndrews, Held & Malloy, Ltd.

(57) ABSTRACT

A transceiver system may be configured to provide tunable bandwidths. The transceiver may comprise a signal processing component and a filtering component, which may comprise a plurality of filters. The signal processing component may determine one or more adjustments that are applicable to one or both of a first filter that is configured for filtering signals corresponding to a first frequency band associated with a first stream, and a second filter that is configured for filtering signals corresponding to a second frequency band associated with a second stream. The one or more adjustments may correspond to modifications in one or both of the first frequency band and the second frequency band. The one or more adjustments may be communicated to the filtering component, which may apply the adjustments to one or more of the plurality of filters.

18 Claims, 6 Drawing Sheets

(56) References Cited

U.S. PATENT DOCUMENTS

| | | | | |
|---|---|---|---|---|
| 8,903,333 B1* | 12/2014 | Khlat | H04B 1/525 | 343/722 |
| 2001/0044712 A1* | 11/2001 | Vainio | G10L 19/18 | 704/201 |
| 2003/0194165 A1* | 10/2003 | Silberberg | G02B 6/272 | 385/11 |
| 2005/0084053 A1* | 4/2005 | Rohde | G06K 13/0825 | 375/376 |
| 2005/0107051 A1* | 5/2005 | Aparin | H04B 1/525 | 455/126 |
| 2005/0288059 A1* | 12/2005 | Maejima | H04B 1/3805 | 455/557 |
| 2006/0018289 A1* | 1/2006 | Schulist | H04W 52/50 | 370/335 |
| 2006/0222022 A1* | 10/2006 | Shintani | H04N 5/775 | 370/537 |
| 2006/0256799 A1* | 11/2006 | Eng | H04L 12/2801 | 370/401 |
| 2006/0291428 A1* | 12/2006 | Filipovic | H04B 1/0035 | 370/335 |
| 2007/0127468 A1* | 6/2007 | Choi | H04L 12/2801 | 370/389 |
| 2007/0217488 A1* | 9/2007 | Smaini | H04B 1/525 | 375/219 |
| 2008/0129422 A1* | 6/2008 | Alford | H01P 7/10 | 333/209 |
| 2009/0323713 A1* | 12/2009 | Futch | H04L 5/1438 | 370/442 |
| 2010/0311383 A1* | 12/2010 | Abbaspour-Tamijani | H01P 5/12 | 455/340 |
| 2011/0001573 A1* | 1/2011 | Carmel | H03H 7/12 | 333/17.1 |
| 2011/0255452 A1* | 10/2011 | Brooks | H04L 12/2801 | 370/297 |
| 2011/0292989 A1* | 12/2011 | Nguyen | H04L 25/03006 | 375/229 |
| 2012/0105143 A1* | 5/2012 | Strachan | G06K 7/0008 | 327/553 |
| 2012/0252394 A1* | 10/2012 | Balakrishnan | H04B 1/405 | 455/313 |
| 2013/0040555 A1* | 2/2013 | Rimini | H04B 1/525 | 455/1 |

\* cited by examiner

METHOD AND SYSTEM FOR TUNABLE UPSTREAM BANDWIDTH UTILIZING AN INTEGRATED MULTIPLEXING DEVICE

CLAIM OF PRIORITY

This patent application makes reference to, claims priority to and claims benefit from the U.S. Provisional Patent Application Ser. No. 61/642,514, having the title "METHOD AND SYSTEM FOR TUNABLE UPSTREAM BANDWIDTH UTILIZING AN INTEGRATED DEVICE SUCH AS A DIPLEXER OR TRIPLEXER," which was filed on May 4, 2012.

This patent application also makes reference to:

U.S. patent application Ser. No. 13/301,102, having the title "METHOD AND APPARATUS FOR BAND SEPARATION FOR MULTIBAND COMMUNICATION SYSTEMS," which was filed on Nov. 11, 2011; and U.S. patent application Ser. No. 13/356,265, having the title "METHOD AND APPARATUS FOR AN ENERGY-EFFICIENT RECEIVER," which was filed on Jan. 23, 2012.

Each of the above stated applications is hereby incorporated herein by reference in its entirety.

TECHNICAL FIELD

Aspects of the present application relate to communications. More specifically, certain implementations of the present disclosure relate to tunable upstream bandwidth utilizing an integrated multiplexing device.

BACKGROUND

Frequency division multiplexing enables the concurrent communication of multiple signals over the same physical medium. In a frequency division multiplexed system, signals are frequency-converted to an assigned frequency band prior to being transmitted over the physical medium. To enable recovering the signals at the receiver, each of the different signals is assigned to a different frequency band or bands. The receiver then separates the received composite signal into the various frequency bands, and then processes the signal received in one or more of the assigned frequency bands to recover the information contained in that signal. Conventional circuitry utilized for separating the frequency bands, however, is costly.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for tunable upstream bandwidth utilizing an integrated multiplexing device, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Certain embodiments of the invention may be found in method and system for tunable upstream bandwidth utilizing an integrated multiplexing device. As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
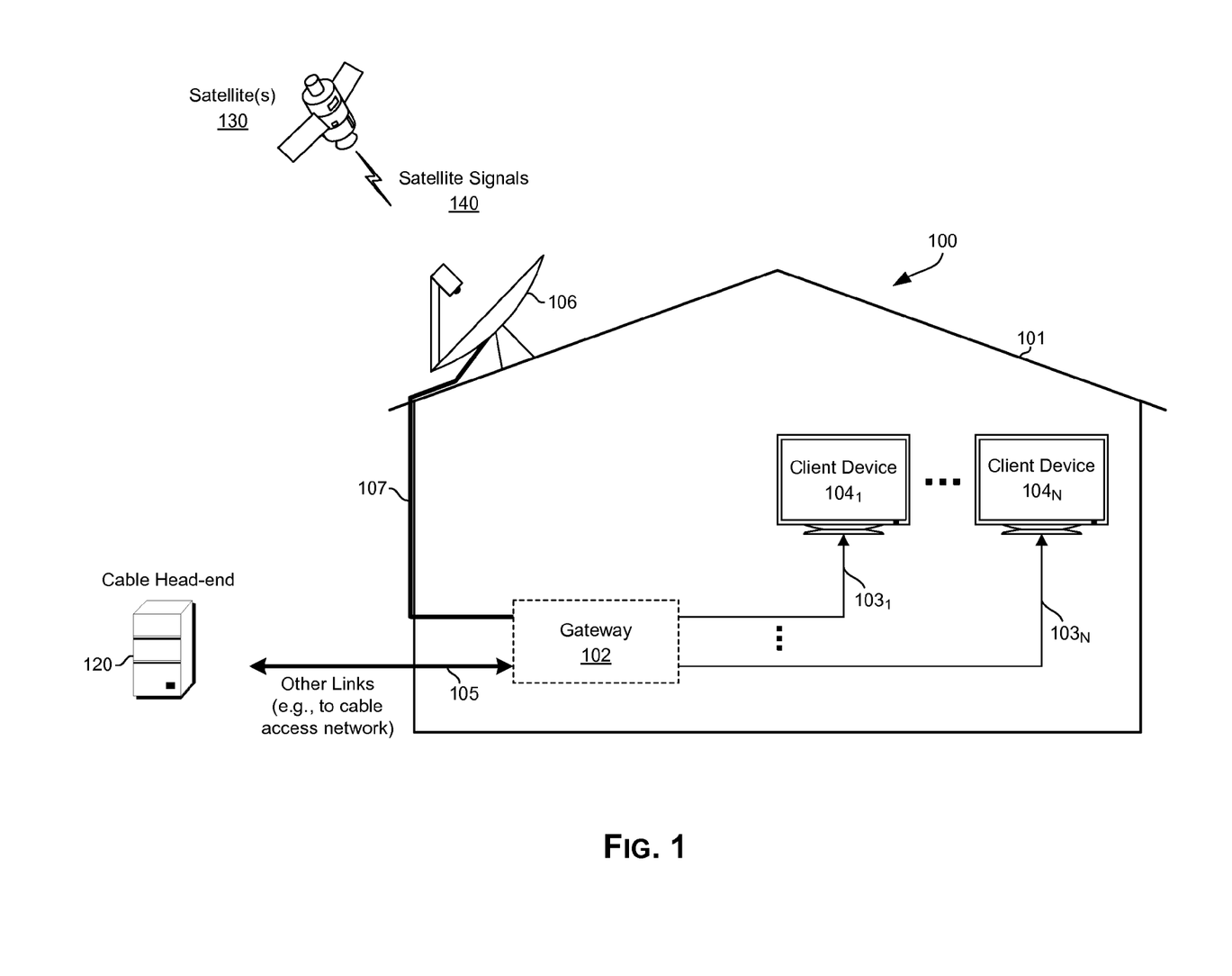
FIG. 1 is a block diagram that illustrates an example home network, which may be used in accordance with various implementations of the invention.

FIG. 1 is a block diagram that illustrates an example home network, which may be used in accordance with various implementations of the invention. Referring to FIG. 1, there is shown an in-premises network 100.

The in-premises network 100 may be configured to service particular premises 101 (e.g., residential or commercial). In this regard, the in-premises network 100 may be configured to provide and/or enable broadband and/or television (or other similar content broadcast) access in the premises 101. The in-premises network 100 may comprise, for example, a gateway 102 and a plurality of client devices $104_1$-$104_N$. In this regard, the gateway 102 may comprise suitable circuitry, interfaces, logic, and/or code for enabling servicing a plurality of client devices (e.g., the client devices $104_1$-$104_N$), which may comprise devices that may communicate with the gateway 102 via one or more point-to-point media links (e.g., HDMI, Display Port, analog video links, analog video links, or the like). The client devices $104_1$-$104_N$ may comprise televisions and similar devices that may be used in displaying or playing back multimedia content that may be broadcasted (e.g., via terrestrial signals, satellite signals, cable signals, and/or over the Internet). The disclosure is not limited, however, to any particular type of client devices.

The gateway 102 may be configured to support or enable providing services or functions pertaining to, for example, content distribution and/or broadband access in the in-premises network 100. In this regard, the gateway 102 may be configured to facilitate and/or handle reception and/or transmission of signals that may be used to enable content distribution and/or broadband accessibility in the in-premises network 100 (e.g., to the plurality of client devices $104_1$-$104_N$). This may be achieved by configuring the gateway 102 to support appropriate internal and/or external connections, such as to enable connectivity to the plurality of client devices $104_1$-$104_N$, and/or to various external devices, systems, or networks that may be needed. In this regard, the gateway 102 may be operable to support communications over a plurality of external links (i.e., links that may be utilized in connecting gateway 102 to external entities, such as broadcast or service head-ends), communications over a plurality of internal links (i.e., links used within the in-premises network 100, such as links $103_1$-$103_N$, which may be utilized in connecting the gateway 102 to the client devices $104_1$-$104_N$), and/or to process signals communication over these links.

The plurality of internal links $103_i$ may comprise wired, wireless, and/or optical links that may be suited for use in an environment such as the in-premises network 100. For example, the internal links $103_i$ may comprise wired connections (e.g., HDMI connections, Display Port links, Multimedia over Coax Alliance (MoCA) links, or Ethernet connections), and/or wireless connections (e.g., Wi-Fi, Zig-Bee, wireless USB, or the like).

The external links (e.g., network link 105) may be configured based on the type of external entity (i.e., head-end) and/or the networks utilized in communicating signals therewith. For example, network link 105 may comprise, a coaxial or twisted-pair cable and/or an optical fiber which carries physical layer symbols in accordance with, for example, DSL, DOCSIS, or Ethernet standards (e.g., to facilitate cable television, terrestrial television, and/or Internet accessibility). Accordingly, the network link 105 may be utilized to enable connectivity between the gateway 102 and one or more cable (or other similar service provider) head-ends 120.

In some instances, connectivity to external systems may necessitate use of local auxiliary devices or systems for enabling the communication of signals. For example, a satellite reception assembly 106 may be utilized (e.g., installed on the roof of the premises 101) to enable satellite based communications (e.g., allow reception of satellite based broadcasts, and, in some instances, transmission of—i.e. uplink, satellite communications). In this regard, a plurality of satellites 130 may be utilized to communication satellite signals 140 (which may typically comprise only downlink communication signals, but the disclosure is not so limited). In this regard, the satellite signals 140 may be utilized to broadcast satellite television content. The satellite signals 140 may comprise, for example, K, Ka, and/or Ku band Direct Broadcast Satellite (DBS) signals. The disclosure, however, is not limited to any particular type of satellite signals. The satellite reception assembly 106 may be a satellite "dish". In this regard, the satellite reception assembly 106 may comprise a reflector—for capturing satellite signals (e.g., the satellite signals 140), and circuitry operable to receive and to process the received satellite signals, such as to recover data carried in the satellite signals (e.g., television channels, media content, etc.), and configure a suitable output corresponding to the recovered data for transmission to other devices that may handle use and/or distribution of the data (e.g., to the gateway 102 via a network link 107). The network link 107 may comprise one or more wired, wireless, and/or optical links. The network link 107 may comprise, for example, a wired (e.g., coaxial and/or twisted-pair) and/or wireless communication medium which carries physical layer symbols in accordance with, for example, Multimedia over Coax Alliance (MoCA), Ethernet, and/or DBS standards.

The gateway 102 may be operable to receive signals communicated from external entities (e.g., satellites 130 and/or head-ends 120), such as via network link 105 and/or the combination of satellite signals 140 and link 107; and process the signals as necessary for obtaining data and outputting the data via corresponding signals over the internal links $103_i$ to the client devices $104_i$. Similarly, the gateway 102 may be operable to receive signals communicated from the client devices $104_i$, over the internal links $103_i$, and process the signals as necessary for obtaining data and outputting the data via corresponding signals to the external entities (e.g., satellites 130 and/or head-ends 120), such as via network link 105 and/or satellite signals 140/link 107. Accordingly, the term "gateway" in this disclosure refers to a client device which may perform satellite set-top box functions, cable television receiver functions, terrestrial television receiver functions, WAN/LAN modem functions, etc. In this regard, "satellite set-top box" functions may comprise functions necessary for delivering data from the cable head-ends, satellites, broadband head-ends, web servers, and the like to devices within the premises.

In operation, the in-premises network 100 may be setup and/or used to provide various services (e.g., broadband and/or television access) within the premises 101. In this regard, the in-premises network 100 may comprise a network configured based on one or more types of interfaces or standards, to interconnect various devices (e.g., the gateway 102 and client devices $104_1$-$104_N$) within a physical space (e.g., the premises 101), to allow connectivity therebetween and/or to access networks (i.e., external to the premises 101). The in-premises network 100 may be setup as Internet Protocol (IP) based network, using WiFi, Ethernet, Bluetooth, and/or similar connections, and may be configured to support various IP-based services such as broadband or IP-based TV (IPTV) services. The disclosure, however, is not so limited.

In some instances, at least some of the data utilized in the in-premises network 100 may be received from external sources, such as from broadband or broadcast sources (e.g., the satellites 130 and/or the cable head-ends 120). In this regard, the gateway 102 may be utilized to service the in-premises network 100, such as by providing to the client devices 104₁-104ₙ access to external networks/connections. In this regard, the gateway 102 may facilitate communication of signals between the client devices 104₁-104ₙ and the external sources. For example, the gateway 102 may be utilized to route communications between cable head-ends 120 and one or more of client devices 104₁-104ₙ. In this regard, a client device 104ᵢ may receive from the cable head-end 120 streams containing, e.g., multimedia content. In some instance, the interactions with the cable head-end may be bi-directional. For example, client device 104ᵢ may transmit to the cable head-end 120 signals or streams, such as containing user commands or requests (e.g., for particular content) or the like. Communications between client devices and head-ends may be configured in accordance with particular protocols. For example, cable communications may be configured in accordance with DOCSIS protocol(s). In some instances, different bands may be specified for the different communication directions (i.e., uplink vs. downlink). For example, in DOCSIS, band 5-42 MHz is utilized for uplink (or 'cable upstream') communications—i.e., for communication from the client device to the head-end, whereas the band 85-1003 MHz is utilized for downlink (or 'cable downstream') communications—i.e., for communication from the client device to the head-end.

In an exemplary aspect of the invention, the gateway 102 may be configured to support multiband communications, to allow communication of a plurality of streams, including communications with the same external peer (e.g., cable head-end 120 or satellite 130) in both directions, including over the same physical medium. For example, the gateway 102 may incorporate use of a multiplexer (e.g., a diplexer or triplexer) to allow use of the same coaxial cable for both cable downstream and cable upstream (including use at the same time). In addition, the same coaxial cable may also be used by other communications streams (e.g., MoCA). In various implementations, the gateway 102 may incorporate a dynamically tunable design. In this regard, the gateway 102 may be configured to allow for adjusting or modifying the bands assigned or allocated to the different streams that may be communicated through the gateway 102.

For example, in some instances the band(s) assigned to the cable upstream may be changed (e.g., increased, to accommodate higher bandwidth requirement by the user). Such change would typically require modifying (physically changing) components in set-top boxes that are specifically designed for fixed bands. Instead, with use of a dynamically tunable/modifiable architecture, the gateway 102 (or components thereof) may be reprogrammed or adjusted to allow for such band changes and/or for any resultant/related changes (e.g., corresponding reduction in related bands/ streams, such as bands used for cable downstream and/or MoCA communications). FIGS. 2-5 disclose various example implementations incorporating such dynamically tunable designs. However, while some of the implementations disclosed are described with respect to cable related communication (e.g., DOCSIS based cable upstream/downstream and/or MoCA), the disclosure is not so limited. Accordingly, similar design/approach may be similarly utilized to provide tunable multiplexing devices for use in connecting local and remote peers (e.g., client devices and head-ends) for other physical mediums, protocols, and/or bands.

Figure 2:
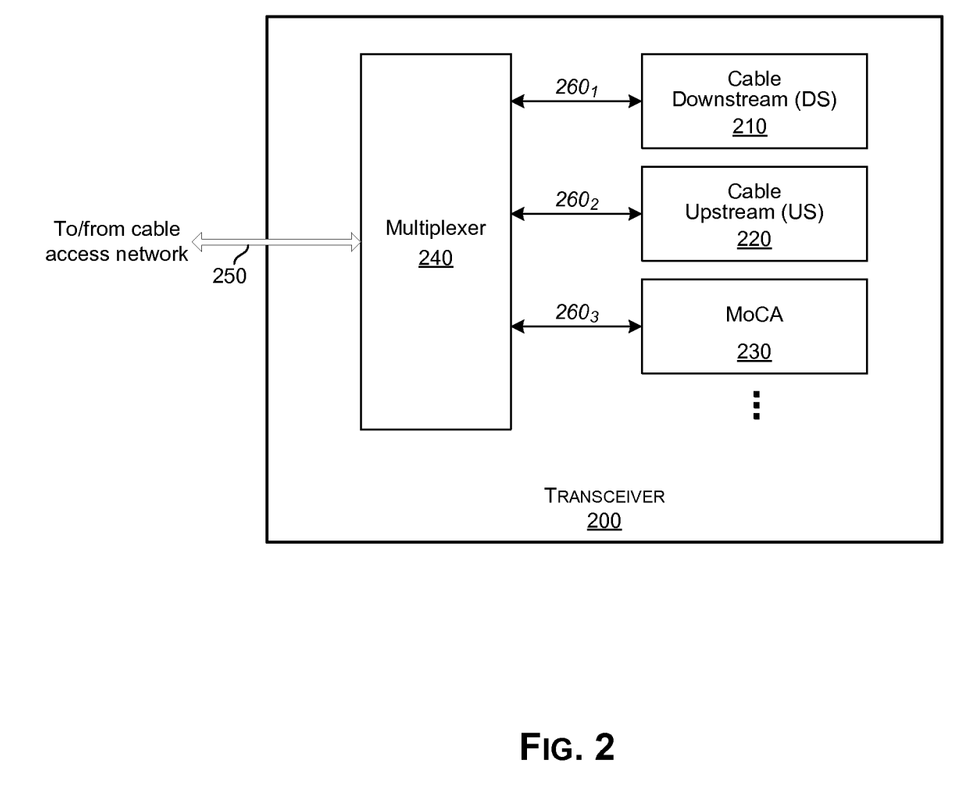
FIG. 2 is a block diagram that illustrates an example multiband communication system that supports multiplexing various communication streams, which may be used in accordance with various implementations of the invention.

FIG. 2 is a block diagram that illustrates an example multiband communication system that supports multiplexing various communication streams, which may be used in accordance with various implementations of the invention. Referring to FIG. 2, there is shown a transceiver system 200.

The transceiver system 200 may comprise suitable circuitry, interfaces, logic, and/or code for use in transmitting and/or receiving a plurality of streams (e.g., using wireline or wireless RF signals), such as over physical link 250. The physical link 250 may comprise, for example, coaxial or twisted-pair cabling. For example, the transceiver system 200 may be utilized to support communication (transmission and/or reception) of streams to and/or from remote systems (e.g., cable head-ends) and/or local/nearby systems (e.g., with other devices co-located with a device that comprises the transceiver system 200 within a particular physical space, such as the home network 100 of FIG. 1). The transceiver system 200 may comprise transceiver circuitry residing, for example, in a set-top-box or similar devices (e.g., the gateway 102 of FIG. 1). In this regard, examples of streams that may be supported by the transceiver system 200 may comprise cable (e.g., DOCSIS based) streams, when the transceiver system 200 is communicating with cable head-ends, and/or Multimedia over Coaxial Alliance (MoCA) streams, such as when the transceiver system 200 interacts with other (local) devices or systems. The disclosure, however, is not so limited, and the transceiver system 200 may be utilized in substantially the same manner as described herein with respect to various types of streams. As shown in FIG. 2 by way of example, the transceiver system 200 may comprise a cable television downstream ("cable DS") processing module 210, a cable upstream ("cable US") processing module 220, where cable US comprises, for example, a DOCSIS based upstream, a Multimedia over Coaxial Alliance (MoCA) processing module 230, and a multiplexer 240.

The cable DS processing module 210 may comprise suitable circuitry, interfaces, logic, and/or code operable to process cable DS signals. Examples of operations performed by the cable DS processing module 210 comprise demodulation and decoding of cable DS signals.

The cable US processing module 220 may comprise suitable circuitry, interfaces, logic, and/or code operable to process cable US signals. Examples of operations performed by the cable US processing module 220 comprise modulation and encoding of cable US signals.

The MoCA processing module 230 may comprise suitable circuitry, interfaces, logic, and/or code operable to process MoCA signals. Examples of operations performed by the MoCA processing module 230 comprise modulation, demodulation, encoding, and decoding of MoCA signals.

The multiplexer 240 may comprise suitable circuitry, interfaces, logic, and/or code for selectively filtering signals during communication to/from the transceiver system 200— e.g., passing (or blocking) signals in particular bands in one or both direction (from or into the transceiver system 200). As shown in FIG. 2, the multiplexer 240 may be configured as, for example a 'triplexer', whereby it may be setup to selectively handle signals corresponding to three different ranges. In this regard, the multiplexer 240 may be configured to allow/pass through from the transceiver system 200 only signals having frequencies within a first range (e.g., defined as corresponding to the cable US), to allow/pass through into the transceiver system 200 only signals having frequencies within a second range (e.g., defined as corresponding to the cable DS), and to block signals having frequencies within a third range (e.g., defined as that corresponding to MoCA, which while sharing the same coaxial cables used by cable, is limited to local interactions—i.e., within the home network). In other instances, the multiplexer may only use to use handle two streams (e.g., only cable US and cable DS), in which case it may be referred as 'diplexer'. In some instances, the multiplexer 240 may be operable to demultiplex a multiplexed (e.g., frequency multiplexed) signal into its constituent signals. Use of triplexers and diplexers for band separation in multiband communication systems is described in more detail in the U.S. patent application having Ser. No. 13/301,102, which was filed on Nov. 11, 2011, and which is incorporated herein by reference in its entirety.

In operation, a composite signal comprising a cable US signal, a cable DS signal, and a MoCA signal is present on the physical link 250. A first component of the composite signal may comprise cable US signals, which may utilize a first frequency band on the physical link 250. A second component of the composite signal may comprise cable DS signals, which may utilize a second frequency band on the physical link 250. A third component of the composite signal may comprise MoCA signals, which utilize a third frequency band on the physical link 250. The multiplexer 240 (which in such scenario would be a triplexer) may filter the composite signal to reduce undesired signal components at each of the MoCA processing module 230, the cable DS processing module 220, and the cable US processing module 210. In various implementations, the transceiver system 200 may be configured to incorporate a dynamically tunable architecture. In this regard, the transceiver system 200 may comprise one or more components which may be used to allow for adjusting or modifying of the frequency bands assigned or allocated to the different streams that may be communicated through the transceiver system 200. Accordingly, the frequency band assigned or allocated to the cable DS signals, cable US signals, and/or the MoCA signals may be modified (even in real-time or on the fly), and the transceiver system 200 may be re-tuned dynamically to account for these changes—e.g., the multiplexer 240 reconfigured to handling received/transmitted composited signals based on the band re-assignments/re-allocations. An example of such implementation is described in FIG. 3.

Figure 3:
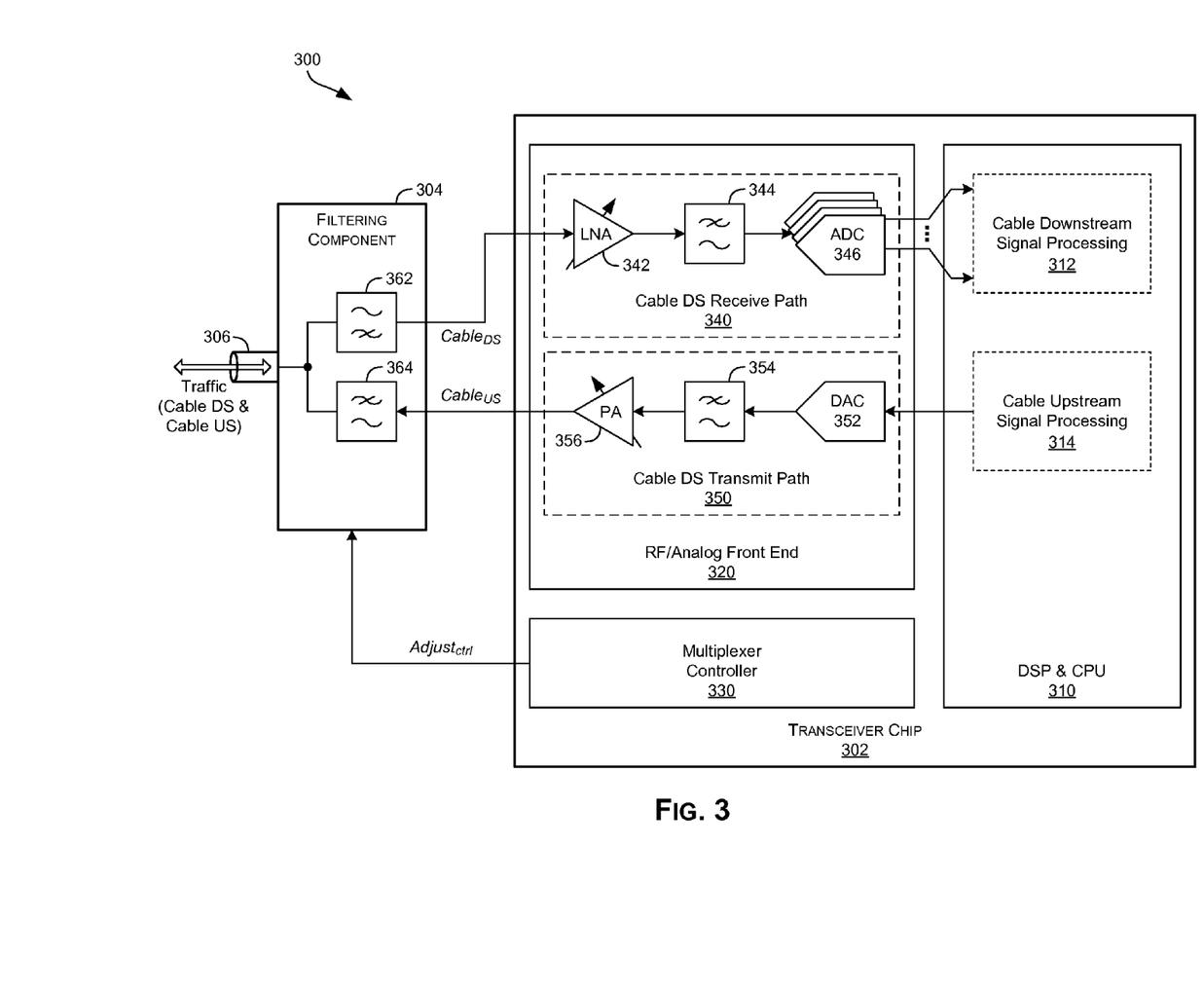
FIG. 3 is a block diagram that illustrates an example integrated diplexer based transceiver system that may be utilized for providing tunable upstream bandwidth, in accordance with an embodiment of the invention.

FIG. 3 is a block diagram that illustrates an example integrated diplexer based transceiver system that may be utilized for providing tunable upstream bandwidth, in accordance with an embodiment of the invention. Referring to FIG. 3, there is shown an integrated diplexer based transceiver system 300.

The transceiver system 300 may be substantially similar to the transceiver system 200 of FIG. 2. In this regard, the transceiver system 300 may comprise suitable circuitry, interfaces, logic, and/or code for use in transmitting and/or receiving a plurality of streams (e.g., using wireline or wireless based RF signals), using a multiplexing based filtering component to control passing (or blocking) of streams corresponding to particular bands. In this regard, in some instances multiple streams may be communicated concurrently (and/or in both direction—i.e., downstream/downlink, that is to the transceiver system 300 and upstream/uplink, that is from the transceiver system 300) over the same physical medium (e.g., link 306). The link 306 may comprise, for example, a coaxial or a twisted-pair cable. The transceiver system 300 may comprise, for example, a transceiver chip 302 and an off-chip filtering component 304.

The transceiver chip 302 may comprise suitable circuitry, interfaces, logic, and/or code for processing streams communicated by the transceiver system 300. In this regard, transceiver chip 302 may be operable to perform such functions as amplification, modulation/demodulation, encoding/decoding, conversions (digital-to-analog and analog-to-digital), and the like. The transceiver chip 302 may comprise, for example, a digital signal processing (DSP)/central processing unit (CPU) 310, a RF/analog front end 320, and a multiplexing controller 330.

The DSP/CPU 310 may comprise suitable circuitry, interfaces, logic, and/or code for performing various processing functions, such as digital signal processing (DSP), other signal processing related functions (e.g., modulator-demodulator (modem) related functions), and/or other processing functions typically associated with a central processing unit (CPU) (e.g., data manipulation, control and management of the transceiver chip 302 and/or its components, etc.). For example, the DSP/CPU 310 may be operable to perform digital signal processing, such as cleaning up signals transmitted or received by the transceiver system 300. In this regard, the DSP/CPU 310 may be operable to perform channel selection and/or filtering, digital scaling, rate conversions, and/or the like. The DSP/CPU 310 may also be operable to perform other, more specialized signal processing related operations. For example, when processing received signals, the DSP/CPU may be operable to perform synchronization, equalization and/or demapping, and/or channel encoding when processing received signals. The channel decoder may utilize a concatenated code such as an inner code and an outer code. An example of such a concatenated code may comprise a low-density parity-check (LDPC) code followed by a Bose-Chaudhuri-Hocquenghen (BCH) code. When processing signals for transmission, the DSP/CPU may be operable to perform channel encoding and/or equalization, and/or mapping. In some instances, the DSP/CPU 310 may also be configured to support full spectrum capture (e.g., performing necessary MAC layer and/or Link layer operations required therefor).

The DSP/CPU 310 may comprise portions (logical and/or physical) that may be specifically configured to support handling of particular streams. For example, when supporting communication of cable streams, the DSP/CPU 310 may comprise a cable downstream (DS) signal processing module 312 and a cable upstream (US) signal processing module 314. In this regard, the cable DS signal processing module 312 may comprise suitable circuitry, interfaces, logic, and/or code operable to perform digital signal processing (and/or other related signal processing functions) of cable DS signals, such as to enable processing of digital baseband signals that are obtained or generated by the RF/analog front end 320 based on received analog signals. The cable US signal processing module 314 may comprise suitable circuitry, interfaces, logic, and/or code operable to perform digital signal processing (and/or other related signal processing functions) of cable US signals, such as generating baseband signals that are suitable for modulation by the RF/analog front end 320.

The RF/analog front end 320 may comprise suitable circuitry, interfaces, logic, and/or code that may be operable to perform RF transmission and/or reception, over a plurality of frequency bands, and/or perform various related analog processing operations, during communications from and/or to the transceiver system 300.

In some instances, the RF/analog front end 320 may comprise dedicated portions (logical and/or physical) that may be specifically configured to support transmission and/or reception of particular RF signals (and/or performing necessary analog processing associated therewith). For example, when supporting communication of cable streams, the RF/analog front end 320 may comprise a cable downstream (DS) receive path 340 and a cable upstream (US)

transmit path 350. In this regard, each of the cable DS receive path 340 and the cable US transmit path 350 may comprise suitable circuitry, interfaces, logic, and/or code of the RF/analog front end 320 that are configured to particularly perform RF communication (reception and transmission, respectively) and related analog signal processing of cable DS signals and cable US signals, respectively. For example, the cable DS receive path 340 may comprise one or more variable gain low-noise amplifier (LNAs) 342, one or more filters 344, and one or more analog-to-digital converters (DACs) 346, which may be configured to enable demodulating received downstream signals into corresponding digital baseband signals (for processing by the cable DS signal processing module 314). The cable US transmit path 350 may comprise one or more digital-to-analog converters (DACs) 352, one or more filters 354, and one or more variable gain power amplifier (PAs) 356, which may be configured to enable modulating digital baseband signals (as received from the cable US signal processing module 314) to corresponding upstream signals.

In an implementation, the cable downstream receive path 340 may be configured to support full spectrum capture. U.S. patent application having Ser. No. 13/301,102, which was filed on Nov. 11, 2011, and which is incorporated herein by reference in its entirety, provides more details of an example full spectrum capture receiver.

The multiplexing controller 330 may comprise suitable circuitry, interfaces, logic, and/or code for controlling multiplexing of streams communicated to and/or from the transceiver system. For example, the multiplexing controller 330 may control handling of streams in the off-chip filtering component 304, such as controlling passing or blocking of streams (e.g., based on band ranges associated therewith). In this regard, streams in particular band(s) may be reserved for particular type of communication (e.g., cable) and/or particular direction (upstream or downstream). In some instances, multiplexing conditions may change or be modified. Accordingly, the multiplexing controller 330 may be operable to adjust the operations of the off-chip filtering component 304, such as by generating of control signals (e.g., signal Adjust$_{ctrl}$ shown in FIG. 3) which may be sent to the off-chip filtering component 304 to cause changes in operations thereof.

The off-chip filtering component 304 may comprise suitable circuitry, interfaces, logic, and/or code for handling routing of streams communicated by the transceiver system 300, such as based on particular bands. For example, the off-chip filtering component 304 may be configured as a multiband filtering module, comprising a plurality of filters that may be operable to filter and/or adjust the corresponding bandwidth of particular signals. Furthermore, the off-chip filtering component 304 may be configured to support use of single physical medium (e.g., the link 306) to communicate multiple streams concurrently and/or in both directions (e.g., cable US signals and cable DS signals). In this regard, the off-chip filtering component 304 may comprise a plurality of special filters for enabling handling of signals associated with particular streams in the off-chip filtering component 304, such as by adaptively passing/blocking these signals, and/or accounting for effects of communication of signals associated with other streams. For example, the off-chip filtering component 304 may comprise suitable logic, circuit, interfaces and/or code that may be operable to function as a downstream filter 362. In this regard, the downstream filter 362 may be operable to filter signals corresponding to cable downstream communications, which (for DOCSIS based communications) may be within approximately the band 85-1003 MHz The downstream filter 362 may also be operable to filter out cable US signals, to prevent saturation that may be caused thereby, since both DS signals and US signals are communicated on the same physical medium—that is the link (e.g., coaxial cable) 306.

The off-chip filtering component 304 may also comprise suitable logic, circuit, interfaces and/or code that may be operable to function as an upstream filter 364. In this regard, the upstream filter 364 may be configured to filter signals corresponding to cable upstream communication, which may be, for DOCSIS based communications, within approximately the band 5-42 MHz. The upstream filter 364 may also be operable to filter out harmonics and other spurious signals generated or caused by the US signals, since both US signals and DS signals are communicated on the same physical medium—that is the link (e.g., coaxial cable) 306. There may be a separation band between the various bands of frequencies that are handled by the different filter modules in the off-chip filtering component 304 (e.g., the upstream filter 364 and the downstream filter 362). The filtering component 304 may be referred to as a diplexer since it is operable to handle the cable upstream (signals) and the cable downstream (signals). Notwithstanding, the disclosure is not limited in this regard. Accordingly, in some instances there may be a third stream (signals) handled, such as a MoCA signals, thus the filtering component 304 would be a triplexer since it may be configured to handle three signals: a cable upstream signal, a cable downstream signal and the MoCA signal. While the filtering component 304 has been described as 'off-chip', the invention is not so limited. Accordingly, in some implementations, at least a portion of the filtering component 304 may be incorporated into (and/or functions associated therewith may be performed by) the transceiver chip 302.

In an example operation, the transceiver system 300 may support communication of composite signals, such as signals comprising cable upstream (US) signals and cable upstream (US) signals. In this regard, the cable US signals may typically utilize a first (fixed) frequency band (e.g., ~5-42 MHz in DOCSIS based systems) whereas the cable DS signals may typically utilize a second (fixed) frequency band (e.g., ~80-1003 MHz in DOCSIS based systems). Accordingly, typical/legacy systems may incorporate a multiplexer (e.g., diplexer) with fixed filtering modules. In other words, the downstream filter 362 and the upstream filter 364 may be simply implemented as fixed filters that operate at the pre-configured frequency bands (for downstream and upstream communications). It some instances, however, it may be desirable to allow for modifications (including dynamic ones) of allocated frequency bands. For example, in some instances it may desirable to allow for adjusting of the frequency band allocated for cable upstream communications, to accommodate for increases/decreases in user required bandwidth. Such band changes, however, may not be feasible with architectures that are tailored for fixed frequency bands. Accordingly, the transceiver system 300 may be configured to allow for dynamic adjustments in frequency bands used for streams communicated by the system.

For example, the downstream filter 362 and the upstream filter 364 may be configured as tunable/reprogrammable filter modules. In this regard, the downstream filter 362 and the upstream filter 364 may comprise suitable logic, circuit, interfaces and/or code that may be operable to adjust corresponding bandwidth of upstream and/or downstream signals, respectively. For example, the upstream filter 364 may comprise a tunable or programmable low pass filter (LPF), with a cutoff frequency of $F_{cus}$. The downstream filter 362 may comprise a tunable or programmable high pass filter (HPF) with a cutoff frequency of $F_{cds}$. Accordingly, the transceiver system 300 may support and/or allow frequency band adjustments, which may be effectuated by tuning/reprogrammable the downstream filter 362 and the upstream filter 364 (e.g., adjusting their cutoff frequencies, $F_{cds}$, and $F_{cus}$). The amount by which the cutoff frequencies, $F_{cds}$, and $F_{cus}$, are adjusted may be determined based on the desired frequency band changes. Furthermore, for added measure of reliability, changes or modifications in (i.e., tuning or reprogramming) the downstream filter 362 and/or the upstream filter 364 may be performed such to maintain a separation band between the frequencies of signals handled by the programmable upstream filter module and the programmable downstream filter module.

For example, the multiplexer controller 330 may be configured to control the adjusting of the bandwidth of the tunable or programmable filters 362 and/or 364. In this regard, the multiplexer controller 330 may be operable to determine any required changes to the filters 362 and/or 364 (e.g., based on reconfiguration of applicable frequency bands, which may be received from the operator, such as through the headend/CMTS, via a control channel for example), and may generate, based on that determination, control signal $Adjust_{ctrl}$, which may be utilized to adjust the bandwidth of the tunable or programmable filters 362 and/or 364. In this regard, in instances where the tuning/reprogramming of the filter is achieved by adjusting their cutoff frequencies, $F_{cds}$, and $F_{cus}$, the control signal, $Adjust_{ctrl}$, may be operable to control the cutoff frequencies (or changes thereof) for the tunable or programmable filters 362 and/or 364 (e.g., specifying new values, or specifying any increases/decreases to the frequencies).

Figure 4:
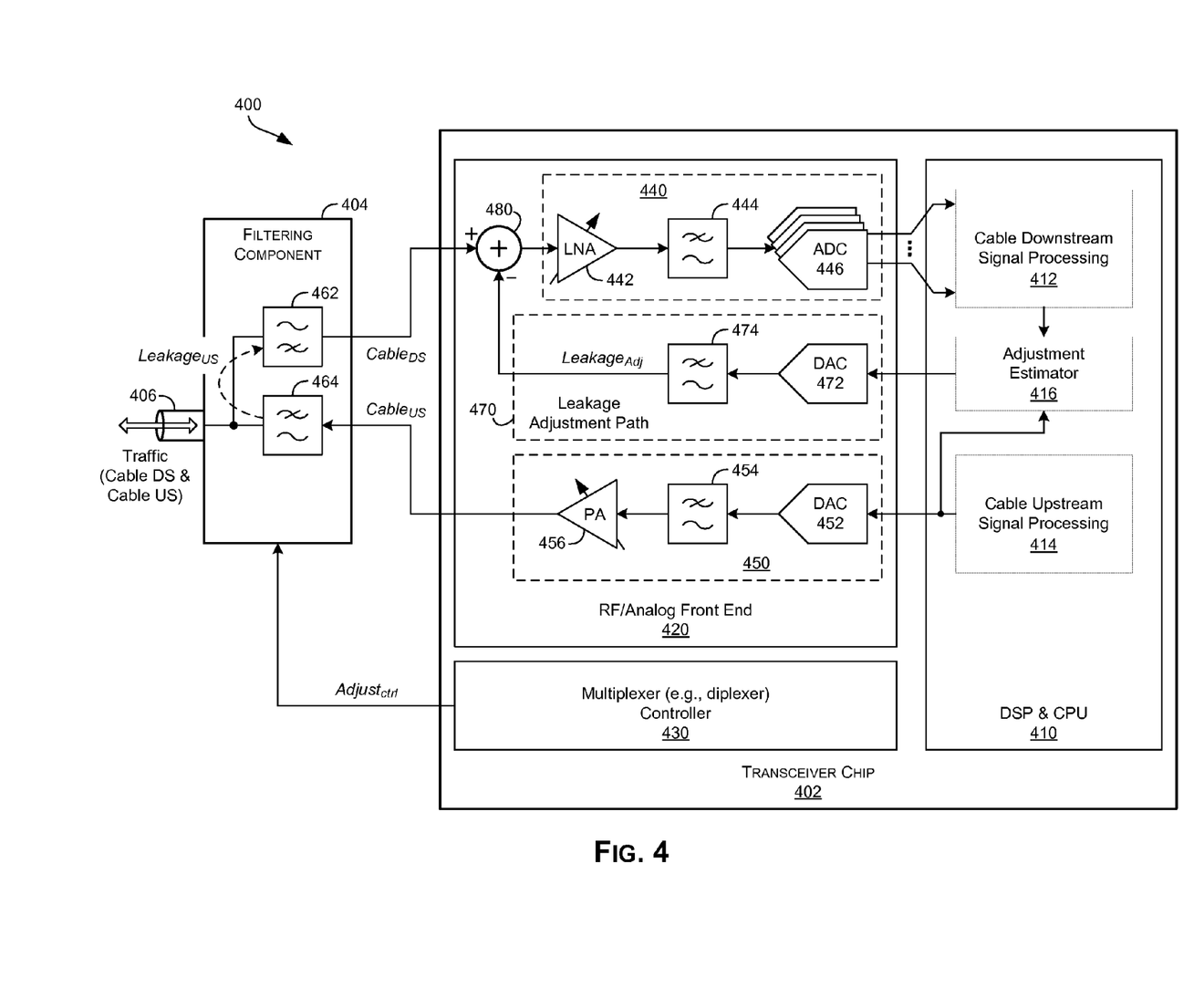
FIG. 4 is a block diagram that illustrates an example integrated diplexer based transceiver system that may be utilized for providing tunable upstream bandwidth with leakage compensation, in accordance with an embodiment of the invention.

FIG. 4 is a block diagram that illustrates an example integrated diplexer based transceiver system that may be utilized for providing tunable upstream bandwidth with leakage compensation, in accordance with an embodiment of the invention. Referring to FIG. 4, there is shown an integrated diplexer based transceiver system 400.

The transceiver system 400 may be substantially similar to the transceiver system 300 of FIG. 3, and may operate substantially in similar manner. In this regard, the transceiver system 400 may comprise a transceiver chip 402 and an off-chip filtering component 404, which may be substantially similar to the transceiver chip 302 and the off-chip filtering component 304, respectively, of FIG. 3. Accordingly, the transceiver system 400 may also be configured to support communication of multiple streams concurrently and/or in both directions (e.g., cable DS and cable US) over the same physical medium, such as link 406, which may be substantially similar to link 306 of FIG. 3 (e.g., a single coaxial cable). For example, the transceiver chip 402 may comprise a DSP/CPU 410 (which may be substantially similar to the DSP/CPU 310 of FIG. 3), a RF/analog front end 420 (which may be substantially similar to the RF/analog front end 320 of FIG. 3), and a multiplexing controller 430 (which may be substantially similar to the multiplexing controller 430 of FIG. 3). Similarly, the off-chip filtering component 404 may comprise a downstream filter 462 and an upstream filter 464, which may be substantially similar to the downstream filter 362 and the upstream filter 364 of FIG. 3). Accordingly, the transceiver system 400 may be configured to determine and/or apply multiplexing related adjustments (e.g., due to changes in stream band allocations), substantially as described for example with respect to the transceiver system 300 of FIG. 3 (e.g., by determining and applying adjustments to the filter modules of the off-chip filtering component 404).

The transceiver system 400, however, may also be configured to support applying leakage related compensation, including during multiplexing adjustments. In this regard, the transceiver system 400 may comprise suitable logic, circuit, interfaces and/or code operable to detect or estimate possible leakages, to determine any necessary adjustments or modifications based thereon, and/or to apply the determined adjustments or modifications. Nonetheless, similar approach may be utilized to provide and/or incorporate compensation for other reasons—i.e., non-leakage related compensation. For example, DS filter 462 (or settings/functions/parameters thereof) may be adjusted to ensure that it may filter out the US signals, so that the input circuitry may not be saturated thus creating distortion (e.g. in LNAs 442). Correspondingly, the US filter 464 (or settings/functions/parameters thereof) may be configured or adjusted to filter out out-of-band harmonics and non-linearity so that it does not interfere with the DS reception. the DSP/CPU 410 may comprise, in addition to a cable downstream (DS) signal processing module 412 and a cable upstream (US) signal processing module 414 (which may be substantially similar to the cable DS signal processing module 312 and the cable US signal processing module 314 of FIG. 3), an adjustment estimator 416. In this regard, the adjustment estimator 416 may comprise suitable logic, circuit, interfaces and/or code for estimating leakage (e.g., interference or noise) that may be caused by the cable upstream signals in the filtering component 404 (shown as $Leakage_{US}$) to cable downstream signals which may be received during communication of the cable upstream signals. The adjustment estimator 416 may estimate expected leakage based on analysis of the cable upstream signals (e.g., using digital baseband signals generated by cable US signal processing module 414, for use in generating the cable upstream signals) and/or the cable downstream signals (e.g., using the digital baseband signals received by cable DS signal processing module 412, for processing thereby).

In an example implementation, necessary leakage adjustments may be applied in the RF/analog front end 420, so as to ensure that baseband signals generated based on the received downstream signals incorporate leakage compensation (i.e., mitigating the need for accounting for leakage and/or performing leakage cancellation during digital signal processing). For example, the adjustment estimator 416 may comprise suitable logic, circuit, interfaces and/or code for generating digital baseband signals corresponding to needed leakage adjustments. The RF/analog front end 420 may then be configured to utilize the leakage baseband signals to apply the necessary leakage adjustments. For example, the RF/analog front end 420 may comprise, in addition to a cable downstream (DS) receive path 440 and a cable upstream (US) transmit path 450 (which may be substantially similar to the cable DS receive path 340 and the cable US transmit path 350, respectively, of FIG. 4), a leakage adjustment path 470. In this regard, the leakage adjustment path 470 may comprise suitable circuitry, interfaces, logic, and/or code for generating RF/analog signals (shown as $Leakage_{Adj}$) which may be used to adjust cable downstream signals in a manner that may allow for compensating for estimated leakage from the cable upstream signals. For example, the leakage adjustment path 470 may comprise one or more digital-to-analog convertors (ADCs) 372 and one or more filters 474, which may be configured to enable modulating digital baseband signals (as received from the adjustment estimator 416) to corresponding RF/analog signals (Leakage$_{Adj}$) corresponding to the estimated leakage (Leakage$_{US}$).

In some instances, the leakage baseband signals may simply correspond to the estimated leakage, such the output of the leakage adjustment path 470 (Leakage$_{Adj}$) may simply represent a copy of the estimated leakage. Thus, leakage compensation may be achieved simply by subtracting the output of the leakage adjustment path 470 (Leakage$_{Adj}$) from the received downstream signals (as obtained via downstream filter 462—i.e., after they have been subjected to leakage form upstream) via a signal adder/combiner 480.

While the filtering component 404 has been described as 'off-chip', the invention is not so limited. Accordingly, in some implementations, at least a portion of the filtering component 404 may be incorporated into (and/or functions associated therewith may be performed by) the transceiver chip 402

Figure 5:
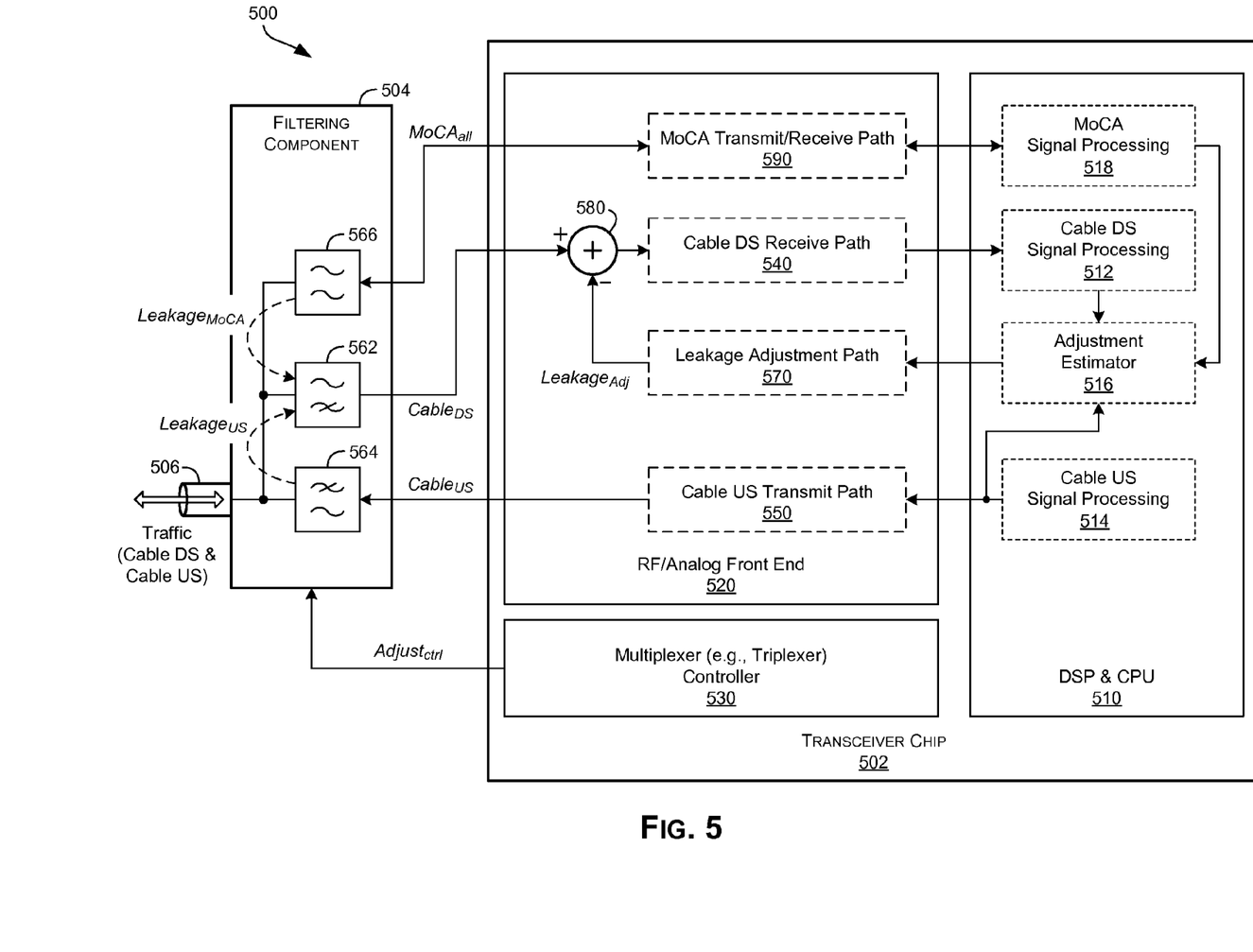
FIG. 5 is a block diagram that illustrates an example integrated triplexer based transceiver system that may be utilized for providing tunable upstream bandwidth with leakage compensation, in accordance with an embodiment of the invention.

FIG. 5 is a block diagram that illustrates an example integrated triplexer based transceiver system that may be utilized for providing tunable upstream bandwidth with leakage compensation, in accordance with an embodiment of the invention. Referring to FIG. 5, there is shown an integrated triplexer based transceiver system 500.

The transceiver system 500 may be substantially similar to the transceiver system 400 of FIG. 4, for example, and may operate in a substantially similar manner. In particular, the transceiver system 500 may comprise suitable logic, circuit, interfaces and/or code for determining and/or applying multiplexing related adjustments (e.g., due to changes in stream band allocations), as well as for determining and applying leakage based compensation, including during multiplexing adjustments. The transceiver system 500, however, may be configured to function as triplexer based system—i.e., supporting multiplexing three different streams, such as cable downstream (DS) and cable upstream (US) as well as a MoCA stream. For example, the transceiver system 500 may comprise a transceiver chip 502 and an off-chip filtering component 504, which may be substantially similar to the transceiver chip 402 and the off-chip filtering component 404, respectively, of FIG. 4. Accordingly, the transceiver system 500 may also be configured to support communication of multiple streams concurrently and/or in both directions (e.g., cable DS, cable US and MoCA) over the same physical medium, such as link 506, which may be substantially similar to link 306 of FIG. 3 (e.g., a single coaxial cable). In this regard, the transceiver chip 502 may comprise a DSP/CPU 510 (which may be substantially similar to the DSP/CPU 410 of FIG. 4), a RF/analog front end 520 (which may be substantially similar to the RF/analog front end 420 of FIG. 4), and a multiplexing controller 530 (which may be substantially similar to the multiplexing controller 530 of FIG. 4).

The transceiver system 500, however, may also comprise suitable logic, circuit, interfaces and/or code configured specifically to support handling the MoCA stream. For example, the DSP/CPU 510 may comprise a cable downstream (DS) signal processing module 512 (which may be substantially similar to the cable DS signal processing module 412 of FIG. 4), a cable upstream (US) signal processing module 514 (which may be substantially similar to the cable US signal processing module 414 of FIG. 4), an adjustment estimator 516 (which may be substantially similar to the adjustment estimator 516 of FIG. 4), and a MoCA processing module 518. In this regard, the MoCA processing module 518 may comprise suitable circuitry, interfaces, logic, and/or code operable to perform digital signal processing (and/or other related signal processing functions) of MoCA signals, such as to enable processing of digital baseband signals that are obtained or generated by the RF/analog front end 320 based on received MoCA RF/analog signals, and/or to generate baseband signals that are suitable for modulation by the RF/analog front end 520 for generating transmitted MoCA RF/analog signals.

Similarly, RF/analog front end 520 may comprise a cable downstream (DS) receive path 540 (which may be, for example, substantially similar to the cable DS receive path 440 of FIG. 4), a cable upstream (US) transmit path 550 (which may be, for example, substantially similar to the cable US transmit path 450 of FIG. 4), and a leakage adjustment path 570 (which may be, for example, substantially similar to the leakage adjustment path 470 of FIG. 4), and a MoCA transmit/receive path 590. In this regard, the MoCA transmit/receive path 590 may comprise suitable circuitry, interfaces, logic, and/or code configured to particularly perform RF/analog signal processing for MoCA communication. For example, the MoCA transmit/receive path 590 may be operable to enable demodulating received MoCA signals into corresponding digital baseband signals (for processing by the MoCA processing module 518), and/or to enable modulating digital baseband signals (as received from the cable US signal processing module 314) to corresponding MoCA signals for transmission from the transceiver system 500.

In addition, the off-chip filtering component 504 may comprise a cable downstream filter 562 and a cable upstream filter 564 (which may be, for example, substantially similar to the downstream filter 462 and the upstream filter 464, respectively, of FIG. 3), and may also comprise suitable logic, circuit, interfaces and/or code that may be operable to function as a MoCA filter 566. In this regard, the MoCA filter 566 may be operable to filter signals corresponding to MoCA communications (e.g., 500-1500 MHz signals).

In an example operation, the multiplexing and/or leakage compensation functions of the transceiver system 500 may be configured to account for the MoCA signals (in addition to the cable DS and cable US). For example, with respect to multiplexing adjustments, transceiver system 500 may be configured to allow for dynamic adjustments in frequency bands used for streams communicated by the system. In this regard, the transceiver system 500 may support communication of composite signals, such as signals comprising cable downstream (DS) signals, cable upstream (US) signals, and MoCA signals. In this regard, the cable US signals may typically utilize a first frequency band (e.g., ~5-42 MHz in DOCSIS based systems), the cable DS signals may utilize a second frequency band (e.g., ~85-1003 MHz in DOCSIS based systems), and the MoCA signals may utilize a third frequency band (e.g., ~1125-1675 MHz). In some instances, however, frequency bands allocated for different streams may be adjusted. For example, the first frequency band allocated for cable upstream communications may be adjusted, such as to accommodate for increases/decreases in user required bandwidth. Such changes may be enabled, and/or accounted for, by use of tunable/programmable filtering modules in the off-chip filtering component 504.

For example, the cable downstream filter 562, the cable upstream filter 564, and/or the MoCA filter 566 may be configured as tunable/reprogrammable filter modules. In this regard, the cable downstream filter 562, the cable upstream filter 564, and/or the MoCA filter 566 may comprise suitable logic, circuit, interfaces and/or code that may be operable to adjust corresponding bandwidth of cable upstream and/or downstream signals, and/or the MoCA signals. For example, the cable upstream filter 564 may comprise a tunable or programmable low pass filter (LPF), with a cutoff frequency of $F_{cus}$. The cable downstream filter 562 may comprise a tunable or programmable high pass filter (HPF) with a cutoff frequency of $F_{cds}$. The MoCA filter 566 may comprise a tunable or programmable band pass filter (BPF) with a cutoff frequency of $F_{cmoca}$. Accordingly, the transceiver system 500 may support and/or allow frequency band adjustments, which may be effectuated by tuning/reprogramming the cable downstream filter 562 and the cable upstream filter 564 (e.g., adjusting their cutoff frequencies, $F_{cds}$, $F_{cds}$, $F_{cus}$, and $F_{cmoca}$). In this regard, the amount by which the cutoff frequencies, $F_{cds}$, $F_{cus}$, and $F_{cmoca}$ are adjusted may be determined based on the desired frequency band changes.

For example, to increase the band assigned to cable upstream communications, the $F_{cus}$ may be adjusted to increase the bandwidth applicable to cable upstream communications, while the $F_{cds}$ may be adjusted to maintain the bandwidth applicable to cable downstream communications, but shift it (e.g., to ~250-1200 MHz), and the $F_{cmoca}$ may be adjusted to reduce the bandwidth applicable to MoCA communications (e.g., to 1250-1500 MHz). Furthermore, for added measure of reliability, changes or modifications in (i.e., tuning or reprogramming of) the cable downstream filter 562 and/or the cable upstream filter 564 may be performed to maintain a separation band between the frequencies of signals handled by the programmable upstream filter module and the programmable downstream filter module.

As with the transceiver system 300, the multiplexer controller 530 may be configured to control the adjusting of the bandwidth of the tunable or programmable filters 562, 564, and/or 566. In this regard, the multiplexer controller 530 may be operable to determine any required changes to the filters 562, 564, and/or 566 (e.g., based on reconfiguration of applicable frequency bands, which may be requested by system operator or network operator, such as through the headend/CMTS, via a control channel for example), and may generate based on that determination control signal $Adjust_{ctrl}$, which may be utilized to adjust the bandwidth of the tunable or programmable filters 562, 564, and/or 566. In this regard, in instances where the tuning/reprogramming of the filter is achieved by adjusting their cutoff frequencies, $F_{cds}$, $F_{cus}$, and $F_{cmoca}$, the control signal, $Adjust_{ctrl}$, may be operable to control the cutoff frequencies (or changes thereof) for the tunable or programmable filters 562, 564, and/or 566 (e.g., specifying new values, or specifying any increases/decreases to the frequencies).

Similarly, with respect to leakage compensation, leakage compensation related adjustment may also account for the MoCA stream and/or effects thereof. For example, the adjustment estimator 516 may be configured to estimate leakage (e.g., interference or noise) that may be caused not only by the would-be-transmitted cable upstream signals ($Leakage_{US}$), but also leakage caused by transmission of MoCA signals (shown as $Leakage_{MoCA}$), and/or to determine corresponding necessary leakage adjustments (e.g., in the form of leakage baseband signals) based on both leakages (i.e., based on both as $Leakage_{MoCA}$). The leakage adjustment may be applied, similarly, in the RF/analog front end 520, such as through a leakage adjustment path 570 (which may be, for example, substantially similar to the leakage adjustment path 470 of FIG. 4). In this regard, the leakage adjustment path 570 may generate an analog signal (shown as $Leakage_{Adj}$) corresponding to the estimated leakage (combined effect of $Leakage_{US}$ and $Leakage_{MoCA}$). In instances where the leakage baseband signals generated by adjustment estimator 516 may simply correspond to the estimated combined leakage, the output of the leakage adjustment path 570 ($Leakage_{Adj}$) may represent a copy of the combined leakage, and as such leakage compensation may be achieved by subtracting it from the cable downstream signals (as obtained via the cable downstream filter 562) via a signal adder/combiner 580.

While the filtering component 504 has been described as 'off-chip', the invention is not so limited. Accordingly, in some implementations, at least a portion of the filtering component 504 may be incorporated into (and/or functions associated therewith may be performed by) the transceiver chip 502.

Figure 6:
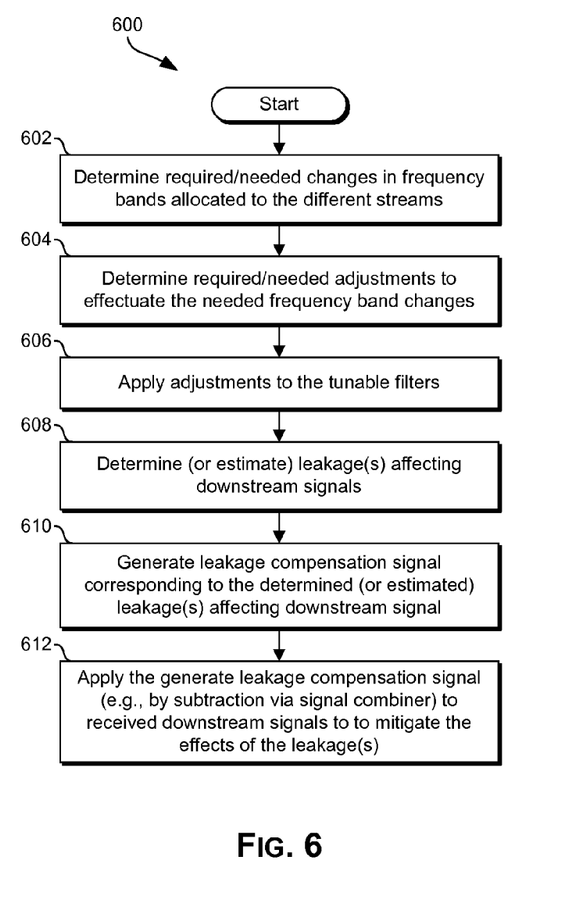
FIG. 6 is a flow chart that illustrates example process for providing tunable upstream bandwidth, in accordance with an exemplary implementation of the invention.

FIG. 6 is a flow chart that illustrates an example process for providing tunable upstream bandwidth, in accordance with an exemplary implementation of the invention. Referring to FIG. 6, there is shown a flow chart 600 comprising a plurality of example steps.

In step 602, required/desired changes or adjustments in frequency bands allocated to the different streams may be determined. In this regard, these changes may be specified (e.g., requested specifically by operator), or may be determined indirectly (e.g., based on a request of increase in bandwidth). In step 604, the required/desired adjustments to effectuate the required/desired frequency band changes may be determined. This may comprise, for example, determining an adjustment to the tunable/reprogrammable filtering modules that may be used in multiplexing the different streams. In step 606, the adjustments determined in the previous step may be applied (e.g., to the tunable filters). In step 608, leakage(s) affecting downstream signals may be determined (or estimated). For example, leakages to cable downstream signals from cable stream signals and/or MoCA signals may be determined (e.g., by direct detection) or estimated (e.g., from analyzing different baseband signals corresponding thereto). In step 610, a leakage compensation signal corresponding to the determined (or estimated) leakage(s) affecting downstream signals may be generated. In step 612, the generated leakage compensation signal may be applied (e.g., by subtraction via signal combiner) to received downstream signals to mitigate the effects of the leakage(s).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for tunable upstream bandwidth utilizing an integrated multiplexing device.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
   in transceiver that comprises a signal processing component and a filtering component:
   determining by the signal processing component, one or more adjustments that are applicable to one or more of a plurality of adjustable filters in the filtering component, wherein:
   the plurality of adjustable filters comprises:
   at least a first filter that is configured for filtering signals corresponding to a first frequency band associated with a first stream,
   a second filter that is configured for filtering signals corresponding to a second frequency band associated with a second stream, and
   a third filter that is configured for filtering signals corresponding to a third frequency band associated with a third stream; and
   the one or more adjustments correspond to modifications in one or both of the first frequency band and the second frequency band;
   communicating the one or more adjustments to the filtering component; and
   applying the one or more adjustments to the one or more of the plurality of adjustable filters in the filtering component, wherein applying at least some of the one or more adjustments to the first filter or the second filter requires one or more modifications to the third filter.

2. The method of claim 1, wherein the first stream and the second stream comprise a cable downstream and a cable upstream.

3. The method of claim 1, wherein the first stream comprises a cable upstream and the first filter comprises a reprogrammable low-pass filter (LPF).

4. The method of claim 1, wherein the second stream comprises a cable downstream and the second filter comprises a reprogrammable high-pass filter (HPF).

5. The method of claim 1, wherein the one or more adjustments comprise adjusting one or more cut-off frequencies applicable to one or more of the plurality of adjustable filters in the filtering component.

6. The method of claim 1, comprising measuring or estimating leakage in the filtering component.

7. The method of claim 6, comprising estimating the leakage in the filtering component based on analysis of digital baseband signals corresponding to signals transmitted or received by the transceiver, using the filtering component.

8. The method of claim 6, comprising determining based on the measured or estimated leakage, a leakage compensation that is applicable to signals received using the filtering component.

9. The method of claim 8, comprising applying the determined leakage compensation by subtracting it from the signals received using the filtering component.

10. A system, comprising:
    one or more circuits for use in a transceiver, wherein:
    the one or more circuits comprise a signal processing component and a filtering component;
    the signal processing component is operable to determine one or more adjustments that are applicable to one or more of a plurality of adjustable filters in the filtering component, wherein:
    the plurality of adjustable filters comprises:
    a first filter that is configured for filtering signals corresponding to a first frequency band associated with a first stream,
    a second filter that is configured for filtering signals corresponding to a second frequency band associated with a second stream, and
    a third filter that is configured for filtering signals corresponding to a third frequency band associated with a third stream; and
    the one or more adjustments correspond to modifications in one or both of the first frequency band and the second frequency band;
    the signal processing component is operable to communicate the one or more adjustments to the filtering component; and
    the filtering component is operable to apply the one or more one or more adjustments to the one or more of the plurality of adjustable filters in the filtering component, wherein applying at least some of the one or more adjustments to the first filter or the second filter requires one or more modifications to the third filter.

11. The system of claim 10, wherein the first stream and the second stream comprise a cable downstream and a cable upstream.

12. The system of claim 10, wherein the first stream comprises a cable upstream and the first filter comprises a reprogrammable low-pass filter (LPF).

13. The system of claim 10, wherein the second stream comprises a cable downstream and the second filter comprises a reprogrammable high-pass filter (HPF).

14. The system of claim 10, wherein the one or more adjustments comprise adjusting one or more cut-off frequencies applicable to one or more of the plurality of adjustable filters in the filtering component.

15. The system of claim 10, wherein the signal processing component is operable to measure or estimate leakage in the filtering component.

16. The system of claim 15, wherein the signal processing component is operable to estimate the leakage in the filtering component based on analysis of digital baseband signals corresponding to signals transmitted or received by the transceiver, using the filtering component.

17. The system of claim 15, wherein the signal processing component is operable to determine based on the measured or estimated leakage, a leakage compensation that is applicable to signals received using the filtering component.

18. The system of claim 17, wherein the signal processing component is operable to apply the determined leakage compensation by subtracting it from the signals received using the filtering component.

\* \* \* \* \*